United States Patent [19]

Yamamoto et al.

[11] Patent Number: 5,219,932
[45] Date of Patent: Jun. 15, 1993

[54] GRAFT COPOLYMERS EXCELLENT IN PROPERTY TO BE COLORED AND THEREMOPLASTIC RESIN COMPOSITIONS WITH THE SAME

[75] Inventors: Naoki Yamamoto; Akira Yanagase; Tadashi Iwasaki; Masakazu Itoh, all of Otake, Japan

[73] Assignee: Mitsubishi Rayon Co., Ltd., Tokyo, Japan

[21] Appl. No.: 784,886

[22] Filed: Oct. 30, 1991

[30] Foreign Application Priority Data

Oct. 30, 1990 [JP] Japan .................. 2-290872
Mar. 7, 1991 [JP] Japan .................. 3-041846

[51] Int. Cl.$^5$ .................. C08L 51/04; C08L 51/08
[52] U.S. Cl. .......................... 525/63; 525/64; 525/66; 525/67; 525/68; 525/479; 525/903
[58] Field of Search .......... 525/63, 64, 66, 67, 525/68, 479, 474, 903

[56] References Cited

U.S. PATENT DOCUMENTS 4,888,388 12/1989 Hongo et al. ............ 525/67
4,894,415 1/1990 Sasaki et al. ............ 525/68
4,994,522 2/1991 Sasaki et al. ............ 525/63
4,994,523 2/1991 Sasaki et al. ............ 525/63
5,011,887 4/1991 Sasaki et al. ............ 525/63

FOREIGN PATENT DOCUMENTS 0332188 9/1989 European Pat. Off. .
0349845 1/1990 European Pat. Off. .
61-138654 6/1986 Japan .

Primary Examiner—Ralph H. Dean, Jr.
Attorney, Agent, or Firm—Cushman, Darby & Cushman

[57] ABSTRACT

A thermoplastic resin comprises a graft copolymer obtained by graft-polymerizing one or more kinds of vinyl monomer onto a compound rubber, wherein that compound rubber is obtained by inseparably entangling a polyalkyl(meth)acrylate rubber and a modified polyorganosiloxane rubber, the modification being obtained by radical polymerization of 1 to 15 parts by weight of at least one monomer selected from the group consisting of a polyfunctional unsaturated compound having at least one (meth) acryloyloxy group and a polyfunctional unsaturated compound having a cyanuric acid or isocyanuric acid skeleton in the presence of a polyorganosiloxane rubber.

7 Claims, No Drawings 5,219,932

GRAFT COPOLYMERS EXCELLENT IN PROPERTY TO BE COLORED AND THEREMOPLASTIC RESIN COMPOSITIONS WITH THE SAME

BACKGROUND OF THE INVENTION

1. Field of the Invention

The present invention relates to a graft copolymer excellent in a property to be colored and a thermoplastic resin composition with the same. More particularly, the present invention relates to a graft copolymer improved in a property to be colored with pigments and obtained by grafting a vinyl monomer onto a compound rubber comprising a modified polyorganosiloxane rubber and a polyalkyl (meth)acrylate rubber and a thermoplastic resin composition with the same.

2. Related Art

Various efforts have so far been made to improve the performance of impact resistant resins. In the course of the efforts, a technique of using a rubber having as low a $T_g$ as possible as the rubber component of impact resistant resins was developed, and a polyorganosiloxane rubber has been used as the rubber component. Examples of this technique is disclosed in Japanese Patent Application Kokai No. 61-138654.

This method, however, cannot improve a bad surface appearance like a dull surface arising from the polyorganosiloxane rubber. In order to improve this surface appearance, a compound rubber graft copolymer obtained by converting the polyorganosiloxane rubber and a polyacrylate rubber into a compound rubber and then graft-polymerizing a vinyl monomer onto this compound rubber is disclosed in U.S. Pat. No. 4,894,415, etc. However, when this compound rubber graft copolymer is used as the rubber component of impact resistant resins, the impact resistant resins thus obtained are poor in a property to be colored with pigments, so that they are of a low industrial value. Further, U.S. Pat. No. 4,888,388 discloses that when the compound rubber graft copolymer is used in a blend with polycarbonate or a polyester resin, the property to be colored with pigments is improved. However, this improvement is not satisfactory, a further improvement having been demanded.

SUMMARY OF THE INVENTION

For this reason, the present inventors have extensively studied on the property to be colored with pigments, and as a result have found that this property is correlated with the transparency at the time of melt-molding of the compound rubber graft copolymer.

Also, the present inventors have found that if the total light transmittance of the compound rubber graft copolymer increases, this properties also improved.

Next, the present inventors have made a study on how to increase the total light transmittance of the compound rubber graft copolymer, and as a result have found that a graft copolymer obtained by graft-polymerizing one or more kinds of vinyl monomer onto a compound rubber in which a modified polyorganosiloxane rubber obtained by radical polymerization of one or more kinds of monomer selected from the group consisting of a polyfunctional unsaturated compound having at least one (meth)acryloyloxy group and a polyfunctional unsaturated compound having a cyanuric acid or isocyanuric acid skeleton in the presence of a polyorganosiloxane rubber, and a polyalkyl (meth)acrylate rubber have been inseparably entangled with each other, has an increased total light transmittance. The present inventors thus attained to the present invention.

Further, the present inventors have found that a resin composition comprising as main constituents at least one thermoplastic resin selected from the group consisting of vinyl (co)polymer resins obtained by (co)polymerizing one or more kinds of vinyl monomer selected from the group consisting of aromatic alkenyl compounds, methacrylates, acrylates and vinyl cyanide, modified polyphenylene ether resins comprising a polyphenylene ether resin and a polystyrene resin, polyvinyl chloride resins, polyamide resins, polycarbonate resins, polyester resins, polyphenylene sulfide resins, polysulfone resins, polyetherimide resins and polyolefin resins, and the above graft copolymer is excellent in the property to be colored with pigments. The present inventors thus attained to the present invention.

The present invention relates to a graft copolymer obtained by graft-polymerizing one or more kinds of vinyl monomer onto a compound rubber in which a modified polyorganosiloxane rubber obtained by radical polymerization of one or more kinds of monomer selected from the group consisting of a polyfunctional unsaturated compound having at least one (meth)acryloyloxy group [hereinafter referred to as polyfunctional (meth)acrylate] and a polyfunctional unsaturated compound having a cyanuric acid or isocyanuric acid skeleton [hereinafter referred to a polyfunctional (iso)-cyanurate] in the presence of a polyorganosiloxane rubber, and a polyalkyl (meth)acrylate rubber have been inseparably entangled with each other.

Further, the present invention relates to a thermoplastic resin composition excellent in a property to be colored with pigments comprising as main constituents the above graft copolymer and at least one thermoplastic resin selected from the group consisting of vinyl (co)polymer resins obtained by (co)polymerizing one or more kinds of vinyl monomer selected from the group consisting of aromatic alkenyl compounds, methacrylates, acrylates and vinyl cyanide, modified polyphenylene ether resins comprising a polypheylene ether resin and a polystyrene resin, polyvinyl chloride resins, polyamide resins, polycarbonate resins, polyester resins, polyphenylene sulfide resins, polysulfone resins, polyetherimide resins and polyolefin resins.

PREFERRED EMBODIMENTS OF THE INVENTION

The compound rubber graft copolymer relating to the present invention is produced as follows.

First, the polyorganosiloxane rubber used in the present invention can be prepared by emulsion polymerization with organosiloxane and a crosslinking agent (I) described below. In this case, a graft-linking agent (I) may be used together if necessary.

As the organosiloxane, three or more-membered cyclic organosiloxanes are given, and those which are preferably used are three to six-membered ones. For example, there are given hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These organosiloxanes are used alone or in mixture of two or more of them.

The amount of these organosiloxanes used is 50 wt. % or more, preferably 70 wt. % or more of the polyorganosiloxane rubber.

As the crosslinking agent (I), trifunctional or tetrafunctional silane crosslinking agents, for example, triethoxyphenylsilane, tetramethoxysilane, tetra-n-propoxysilane, tetraethoxysilane, tetra-n-propoxysilane, tetrabutoxysilane and the like are used. Particularly, tetrafunctional crosslinking agents are preferred, among which tetraethoxysilane is particularly preferred.

The amount of the crosslinking agent (I) used is 0.1 to 30 wt. % of the polyorganosiloxane rubber.

As the graft-linking agent (I), compounds which can form a unit represented by either one of the formulae (I-1), (I-2) and (I-3) are used:

$$CH_2=CR^2-COO-(CH_2)_p-SiR_n^1O_{(3-n)/2} \quad (I\text{-}1)$$
$$CH_2=CH-SiR_n^1O_{(3-n)/2} \quad (I\text{-}2)$$
or
$$HS-(CH_2)_p-SiR_n^1O_{(3-n)/2} \quad (I\text{-}3)$$

wherein $R^1$ represents a methyl, ethyl, propyl or phenyl group, $R^2$ represents a hydrogen atom or a methyl group, n represents an integer of 0, 1 or 2, and p represents an integer of 1 to 6.

(Meth)acryloyloxyalkylsiloxane which can form the unit represented by the formula (I-1), because of its grafting efficiency being high, can form effective graft chains, so that it is advantageous in terms of development of impact resistance. As those which can form the unit of the formula (I-1), methacryloyloxyalkylsiloxane is particularly preferred. Specific examples of methacryloyloxyalkylsiloxane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like.

The amount of the graft-linking agent (I) used is 0 to 10 wt. % of the polyorganosiloxane rubber component.

For producing the polyorganosiloxane rubber, methods described, for example, in U.S. Pat. Nos. 2,891,920, and 3,294,725, etc. can be used. In practicing the present invention, it is preferred to produce the rubber, for example, by the method in which a mixed solution of organosiloxane, the crosslinking agent (I) and if necessary the graft-linking agent (I) is shear-mixed with water with, for example, a homogenizer in the presence of a sulfonic acid emulsifier such as an alkylbenzenesulfonic acid an the like.

The alkylbenzenesulfonic acid acts as an emulsifier for organosiloxane and at the same time acts as a polymerization initiator, so that it is desirable. In this case, it is preferred to use the metal salt of the alkylbenzenesulfonic acid together with the above sulfonic acid because the metal salt has an effect to keep the polymer stable during the graft polymerization.

After polymerization of organosiloxane is carried out at a high temperature and a low temperature, the polymerization is stopped by neutralizing the reaction solution with the aqueous solution of an alkali (e.g. sodium hydroxide, potassium hydroxide, sodium carbonate).

The polyfunctional (meth)acrylate and/or the polyfunctional (iso)cyanurate are bonded to the polyorganosiloxane rubber latex thus produced by polymerization with a radical initiator.

The polyfunctional (meth)acrylate, as defined hereinbefore, refers to a polyfunctional unsaturated compound having at least one (meth)acryloyloxy group. It includes for example allyl methacrylate, ethylene glycol dimethacrylate, propylene glycol dimethacrylate, 1,3-butylene glycol dimethacrylate, 1,4-butylene glycol dimethacrylate, ethylene glycol diacrylate, propylene glycol diacrylate, 1,3-butylene glycol diacrylate, 1,4-butylene glycol diacrylate and the like. These polyfunctional (meth)acrylates are used alone or in mixture of two or more of them.

The polyfunctional (iso)cyanurate, as defined hereinbefore, refers to a polyfunctional unsaturated compound having a cyanuric acid or isocyanuric acid skeleton. It includes triallyl cyanurate and the like.

The amount of the polyfunctional (meth)acrylate and/or the polyfunctional (iso)cyanurate used is 1 to 15 parts by weight based on 100 parts by weight of the polyorganosiloxane rubber. When the amount is less than 1 part by weight, the transparency of the compound rubber graft copolymer is so insufficient that the property to be colored with pigments cannot be made good. When the amount exceeds 15 parts by weight, the rubber elasticity of the polyorganosiloxane rubber lowers, so that the impact resistance also lowers.

These polyfunctional (meth)acrylate and/or the polyfunctional (iso)cyanurate are bonded to the polyorganosiloxane rubber by radical polymerization. This radical polymerization is carried out by the usual method. This method includes a method with a peroxide, a method with an azo initiator, a method with a redox initiator in which an oxidizing agent and a reducing agent have been combined with each other, and the like. Of these methods, the method with a redox initiator is preferred, and particularly, a method with a sulfoxylate initiator in which ferrous sulfate, disodium ethylenediaminetetraacetate, Rongalite and hydroperoxide have been combined with one another is preferred.

Thus, the modified polyorganosiloxane rubber modified with the polyfunctional (meth)acrylate and/or the polyfunctional (iso)cyanurate is obtained.

Next, the compound rubber is prepared by reacting this modified polyorganosiloxane rubber with alkyl (meth)acrylate.

The polyalkyl (meth)acrylate rubber component constituting the compound rubber can be synthesized with alkyl (meth)acrylate, a crosslinking agent (II) and a graft-linking agent (II), described below.

The alkyl (meth)acrylate includes alkyl acrylates (e.g. methyl acrylate, ethyl acrylate, n-propyl acrylate, n-butyl acrylate, 2-ethylhexyl acrylate) and alkyl methacrylates (e.g. hexyl methacrylate, 2-ethylhexyl methacrylate, n-lauryl methacrylate). Particularly, use of n-butyl acrylate is preferred.

The crosslinking agent (II) includes for example ethylene glycol dimethacrylate, propylene glycol dimethacrylate, 1,3-butylene glycol dimethacrylate, 1,4-butylene glycol dimethacrylate and the like.

The graft-linking agent (II) includes for example allyl methacrylate, triallyl cyanurate, triallyl isocyanurate and the like. Allyl methacrylate and triallyl cyanurate can also be used as the crosslinking agent.

Any of the crosslinking agents and graft-linking agents are used alone or in mixture of two or more of them.

The total amount of these crosslinking agent (II) and graft-linking agent (II) is 0.1 to 20 wt. % of the polyalkyl (meth)acrylate rubber.

The amount of the modified polyorganosiloxane rubber is in a rang of 5 to 90 wt. % based on the graft copolymer relating to the present invention.

In practicing the present invention, it is desirable that the main skeleton of the polyorganosiloxane rubber component has a repeating unit of dimethylsiloxane and allyl methacrylate is used as the crosslinking agent, and that the main skeleton of the polyalkyl (meth)acrylate rubber component has a repeating unit of n-butyl acrylate.

Next, one or more kinds of vinyl monomer are graft-polymerized onto the compound rubber thus produced.

As the vinyl monomer, there are given various vinyl monomers such as aromatic alkenyl compounds (e.g. styrene, α-methylstyrene, vinyltoluene); methacrylates (e.g. methyl methacrylate, 2-ethylhexyl methacrylate); acrylates (e.g. methyl acrylate, ethyl acrylate, butyl acrylate); organic acids (e.g. acrylic acid, methacrylic acid); vinyl cyanide compounds (e.g. acrylonitrile, methacrylonitrile) and the like. These vinyl monomers are used alone or in combination of two or more of them. Among these vinyl monomers, the aromatic alkenyl compounds are preferred, and particularly styrene is preferred.

Concerning the weight ratio of the compound rubber and the vinyl monomer to be graft-polymerized onto the former constituting the graft copolymer, the proportion of the compound rubber is 30 to 90 wt. %, preferably 40 to 85 wt. %, and that of the vinyl monomer is 10 to 70 wt. %, preferably 15 to 60 wt. % based on the graft copolymer. When the proportion of the vinyl monomer is less than 10 wt. %, the polyorganosiloxane graft copolymer has no sufficient structure as a graft polymer, so that development of impact resistance is insufficient. When the proportion exceeds 70 wt. %, the rubber content becomes so small that development of impact resistance becomes poor.

For obtaining the graft copolymer, firstly the above vinyl monomer is added to the latex of the compound rubber and subjected to a one-stage or multi-stage polymerization using a radical polymerization technique to obtain the latex of a polyorganosiloxane graft copolymer. Subsequently, this latex is added to the water in which a metal salt (e.g. calcium chloride, magnesium sulfate) has been dissolved to salt it out and coagulate it, and then the coagulated product is separated and recovered.

As specific examples of the vinyl (co)polymer resins which are used in the present invention and obtained by (co)polymerizing one or more kinds of vinyl monomer selected from the group consisting of aromatic alkenyl compounds, methacrylates, acrylates and vinyl cyanide compounds, there are given polystyrene resins, polymethyl methacrylate resins, polychlorostyrene resins, polybromostyrene resins, poly(α-methylstyrene) resins, styrene/acrylonitrile copolymer resins, styrene/methyl methacrylate copolymer resins, styrene/maleic anhydride copolymer resins, styrene/maleimide copolymer resins, styrene/N-phenylmaleimide copolymer resins, methyl methacrylate/butyl acrylate copolymer resins, methyl methacrylate/ethyl acrylate copolymer resins, styrene/acrylonitrile/α-methylstyrene terpolymer resins and the like.

The modified polyphenylene ether resin used in the present invention comprises a polyphenylene ether resin and a polystyrene resin.

This polyphenylene ether resin is a homopolymer or copolymer represented by the formula,

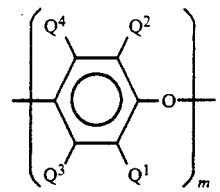

wherein any one of $Q^1$ to $Q^4$ is independently selected from the group consisting of a hydrogen atom and a hydrocarbon group, and m represents a number of 30 or more.

Specific examples of such the polyphenylene ether resin include poly(2,6-dimethyl-1,4-phenylene) ether, poly(2,6-diethyl-1,4-phenylene) ether, poly(2,6-dipropyl-1,4phenylene) ether, poly(2-ethyl-6-propyl-1,4-phenylene) ether, a copolymer of (2,6-dimethyl-1,4-phenylene) ether with (2,3,6-trimethyl-1,4-phenylene) ether, a copolymer of (2,6-diethyl-1,4-phenylene) ether with (2,3,6-trimethyl-1,4-phenylene) ether, a copolymer of (2,6-dimethyl-1,4-phenylene) ether with (2,3,6-triethyl-1,4-phenylene) ether and the like.

Particularly, poly(2,6-dimethyl-1,4-phenylene) ether and a copolymer of (2,6-dimethyl-1,4-phenylene) ether with (2,3,6-trimethyl-1,4-phenylene) ether are preferred, and poly(2,6-dimethyl-1,4-phenylene) ether is more preferred. These polyphenylene ether resins are used alone or in mixture of two or more of them.

There is no particular limitation to the polymerization degree of the polyphenylene ether resins used in the present invention. However, those having a reduced viscosity of 0.3 to 0.7 dl/g at 25° C. in a chloroform solvent are preferably used. Those having a reduced viscosity of less than 0.3 dl/g tend to become poor in heat stability, and those having a reduced viscosity exceeding 0.7 dl/g tend to be injured in moldability.

The polystyrene resin to be blended with the polyphenylene ether resin refers to those containing 50 wt. % or more of the aromatic alkenyl compound of the above vinyl (co)polymer resins. Polystyrene resins are particularly preferred.

The vinyl chloride resin used in the present invention refers to vinyl chloride homopolymers are copolymers of vinyl chloride with at most 50 wt. % (preferably 45 wt. % or less) of a compound having at least one double bond copolymerizable with vinyl chloride. Among these, copolymers of vinyl chloride with a vinyl monomer other than vinyl chloride are preferred. Examples of the compound having at least one double bond include vinylidene chloride, ethylene, propylene, vinyl acetate, acrylic acid, methacrylic acid, their esters, maleic acid, its esters and acrylonitrile.

These vinyl chloride resins are obtained by polymerizing vinyl chloride along or copolymerizing vinyl chloride with other vinyl monomer described above in the presence of a free radical catalyst.

The polymerization degree of the vinyl chloride resins is usually 400 to 4500, particularly preferably 400 to 1500.

The polyamide resin used in the present invention includes polyamides derived from aliphatic, alicyclic or aromatic diamines such as ethylenediamine, tetramethylenediamine, hexamethylenediamine, decamethylenediamine, dodecamethylenediamine, 2,2,4- and 2,4,4-trimethylhexamethylenediamines, 1,3- and 1,4-bis-(aminomethyl)cyclohexanes, bis(p-aminocyclohexyl)methane, m-xylylenediamine, p-xylylenediamine, etc. and aliphatic, alicyclic or aromatic dicarboxylic acids such as adipic acid, suberic acid, sebacic acid, cyclohexanedicarboxylic acid, tetraphthalic acid, isophthalic acid, etc.; polyamides obtained by ring opening polymerization of lactams such as ε-caprolactam, ω-dodecalactam, etc.; polyamides obtained from 6-aminocaproic acid, 1,1-aminoundecanoic acid, 1,2-aminododecanoic acid, etc.; and copolymers or blends thereof. Among these, polyamides which are produced industrially at low cost and in large amounts such as nylon 6, nylon 6.6, nylon 12, nylon 6.10, nylon 4.6 and copolymers or blends thereof are useful. Particularly, nylon 6 and nylon 6.6 are preferred.

The polycarbonate resin used in the present invention refers to one obtained by reacting a bisphenol with phosgene or reacting a carbonate precursor such as diaryl carbonate, etc. Those which are preferred as a bisphenol are bis(hydroxyaryl)alkanes such as for example 2,2'-bis(hydroxyphenyl)propane, 2,2'-bis(4-hydroxy-3,5-dibromophenyl)propane, 2,2'-bis(4-hydroxy-3,5-dichlorophenyl)propane and the like. These bisphenols are used alone or in mixture.

The polyester resin used in the present invention refers to one obtained by polycondensation of a dicarboxylic acid or its derivative (e.g. alkyl esters) with a diol. The dicarboxylic acid includes terephthalic acid, isophthalic acid, adipic acid, sebacic acid and the like. The diol includes ethanediol, propanediol, butanediol, pentanediol, hexanediol and the like. The polyester resin includes polyethylene terephthalate, polytetramethylene terephthalate, polybutylene terephthalate, polyhexamethylene terephthalate and copolymers or blends thereof. In the present invention, polybutylene terephthalate is particularly preferred.

The polyphenylene sulfide resin used in the present invention refers to a polymer containing 70 mole % or more of a repeating unit represented by the formula,

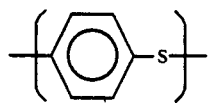

and having a polymerization degree of 80 to 300. As the component to be copolymerized therewith, there are given the following:

meta bonding 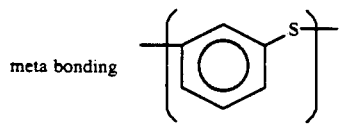

ortho bonding 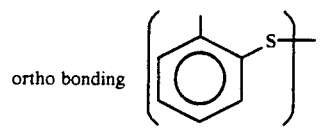

ether bonding 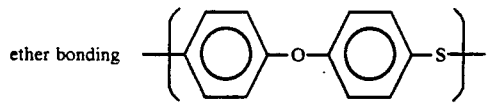

sulfone bonding 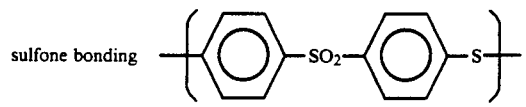

biphenyl bonding 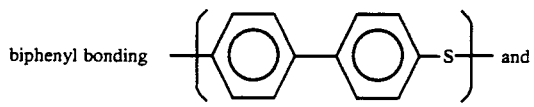 and substituted phenylsulfide bonding 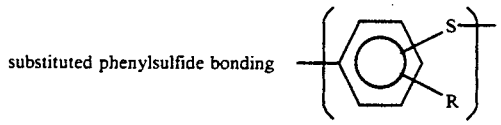

wherein R represents an alkyl, nitro, phenyl, alkoxy, carboxylic acid or metal carboxylate group. The amount of these components is preferably 10 mole % or less.

The polysulfone resin refers to a polymer containing a sulfone group —SO$_2$—), and it is roughly classified into an aromatic polysulfone resin and an olefin polysulfone resin. In the present invention, the aromatic one is used, and it includes for example the following:

A polymer having a repeating unit represented by the formula,

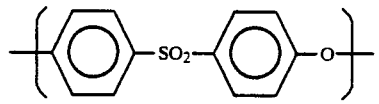

obtained by polycondensation of dichlorodiphenyl sulfone, and a polymer having a repeating unit represented by the formula,

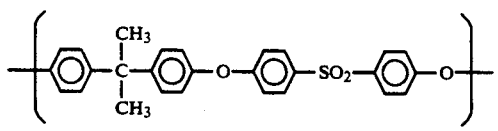

obtained from dichlorodiphenyl sulfone and bisphenol A. Generally, the former is called a polyether sulfone resin, and the latter is called a polysulfone resin. These resins are particularly useful in the present invention.

The polyetherimide resin used in the present invention refers to a polymer having a repeating unit represented by the formula in which both an ether bond and an imide bond are present,

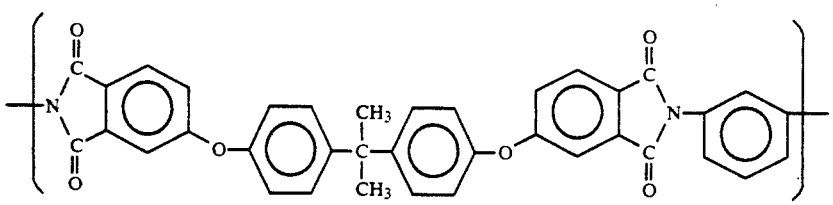

The polyolefin resin used in the present invention is represented by polyethylene and polypropylene. These polyolefin resins may be a copolymer of ethylene or propylene with a compound having at least one double bond copolymerizable therewith. Such the compound includes acrylic acid, methacrylic acid, their esters, maleic acid, its esters, maleic anhydride and the like. It is desirable that these compounds are copolymerized in a proportion of 10 wt. % or less based on polyethylene or polypropylene. The polymerization degree of the above polyolefin resins is preferably 300 to 6000.

In practicing the present invention, the property to be colored with pigments becomes more superior by blending the foregoing graft copolymer with the modified polyphenylene ether resin or the polyvinyl chloride resin. Consequently, a blend of the graft copolymer of the present invention and the modified polyphenylene ether resin, and a blend of the graft copolymer and the polyvinyl chloride resin may be said to be preferred.

For preparing the resin composition of the present invention, it will suffice to mechanically mix the materials with known apparatus such as Banbury mixers, roll mills, twin-screw extruders and the like, and then mold into pellets. The pellet produced by extrusion-molding can be molded over a wide temperature range, and for molding the pellet, a common injection molding machine is used.

Further, into the resin of the present invention may be incorporated if necessary fiber-reinforcing agents, fillers, plasticizers, flame retardants, lubricants, pigments and the like.

According to the present invention, the property to be colored with pigments of the graft copolymer can be greatly improved, in which the polyorganosiloxane rubber has been used. Consequently, it becomes possible to obtain good and colored molded products by molding, for example, injection molding of the compound rubber graft copolymer. The thermoplastic resin composition of the present invention uses the particular compound rubber graft copolymer, so that it gives excellent property to be colored with pigments and impact resistance and a good appearance of molded products as well as is excellent in moldability, flowability and the like.

The present invention will be illustrated with reference to the following examples. In the examples, "part" and "percent (%)" mean "part by weight" and "wt. %", respectively, unless otherwise stated.

Measurement of Izod impact strength was carried out by the method described in ASTM D 258. A test piece of 1 mm in thickness was prepared on a press-molding machine and the light transmittance of this thin test piece was measured.

The property to be colored with pigments was examined as follows. Carbon Black V-9 (produced by Cabot Co., Ltd.) was added in an amount of 0.5 part to the graft copolymer used as a test sample, the mixture was pelletized and then injection-molded into a flat plate of ⅛" in thickness, and then the color of the flat plate was specified according to JIS Z 8729 (a method of indicating an object color according to the L*a*b* colorimetric system). The color of which the L* was less than 20 was made to succeed in the test.

EXAMPLE 1

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. Dodecylbenzenesulfonic acid and sodium dodecylbenzenesulfonate were dissolved each in an amount of 0.67 part in 200 parts of distilled water, and the resulting solution was added to the above siloxane mixture. The resulting mixture was preliminarily stirred at 10,000 rpm with a homomixer and then emulsified and dispersed with a homogenizer under a pressure of 200 kg/cm$^2$ to obtain an organosiloxane latex.

This mixed solution was transferred to a separable flask equipped with a condenser and a stirring blade, and heated at 80° C. for 5 hours with stirring and mixing and then allowed to stand at room temperature for 48 hours. Thereafter, this latex was neutralized to a pH of 7.5 with an aqueous sodium hydroxide solution to obtain a polyorganosilane latex in which polymerization had been completely finished (hereinafter referred to as POS-1).

The conversion of the siloxane mixture of this latex to the polyorganosiloxane rubber was 88.6%, and the number average particle size of the latex was 0.22 μm.

Eighty four parts of POS-1 was sampled and put in a separable flask equipped with a stirrer. After 75 parts of distilled water was added and the atmosphere of the flask was replaced by nitrogen, the contents of the flask were heated to 50° C. At this temperature, a mixed solution of 1.5 parts of allyl methacrylate and 0.1 part of tert-butyl hydroperoxide was added.

A mixed solution of 0.002 part of ferrous sulfate, 0.006 part of disodium ethylenediaminetetraacetate, 0.3 part of Rongalite and 10 parts of distilled water was added to carry out radical polymerization. The reaction mixture was kept at an inner temperature of 60° C. for 1 hour to obtain a modified polyorganosiloxane rubber.

A mixed solution of 24.5 parts of butyl acrylate, 0.50 part of allyl methacrylate and 0.2 part of tert-butyl hydroperoxide was then dropwise added thereto over 60 minutes to carry out polymerization. Thereafter, the reaction mixture was kept at an inner temperature of 60° C. for 1 hour to complete the polymerization. Thus, a compound rubber was obtained.

To this compound rubber was dropwise added a mixed solution of 50 parts of methyl methacrylate and 0.15 part of tert-butyl hydroperoxide over 90 minutes, and the reaction mixture was kept at an inner temperature of 60° C. for 2 hours to complete graft-polymerization onto the compound rubber. The conversion of methyl methacrylate was 99.5%, and the number average particle size of the graft copolymer was 0.24 μm.

This latex was added to an aqueous solution containing 5% of calcium chloride at 40° C. so that the ratio of the latex to the aqueous solution was 1:2. On heating the mixed solution to 90° C., it coagulated. After cooling, the coagulated product was filtered off, separated and dried overnight at 80° C. to obtain a powdery graft copolymer.

Using this dried graft copolymer, a flat plate of 1 mm in thickness was prepared on a press-molding machine. Separately, 0.5 part of Carbon Black V-9 (produced by Cabot Co., Ltd.) was added to 100 parts of this dried graft copolymer, and the resulting blend was pelletized at 250° C. on a twin-screw extruder (trade name, ZSK-30; produced by Werner & Pfleiderer Co.).

The pellets obtained were dried at 70° C. for 8 hours and molded into a flat plate of ⅛" in thickness and a test piece for measuring Izod impact strength with an injection molding machine (Promat injection molding machine produced by Sumitomo Heavy Industries, Ltd.).

The total light transmittance of the flat plate of 1 mm in thickness was measured to find that it was 63%. Specification of color was carried out according to the L*a*b* colorimetric system to find that L* was 18.6, a* was 2.2 and b* was −0.6. The ⅛" Izod impact strength was 8.9 kg.cm/cm.

EXAMPLES 2 TO 7 AND COMPARATIVE EXAMPLES 1 AND 2

POS-1 prepared in Example 1 was modified with various polyfunctional monomers shown in Table 1. A mixed solution of butyl acrylate, allyl methacrylate and tert-butyl hydroperoxide was then added thereto in amounts shown in Table 1. To the compound rubber thus produced was dropwise added a mixed solution of 50 parts of methyl methacrylate and 0.15 part of tert-butyl hydroperoxide over 90 minutes, and the reaction mixture was kept at an inner temperature of 60° C. for 2 hours to complete graft polymerization onto the compound rubber.

The initiator and polymerization method were selected according to Example 1. The graft copolymer obtained was measured for the total light transmittance, L*a*b* of the graft copolymer colored with carbon black and ⅛" Izod impact strength. The results are shown in Table 1.

From the results of Examples 2 and 3, it is can be seen that when the amount of the polyfunctional monomers used for the modification of POS-1 was less than 15 parts based on 100 parts of the polyorganosiloxane rubber, the total light transmittance was 50% or more, the transparency of the flat plate being good, and besides the value of L* was 21 or less, the development of black color being good. On the other hand, when the polyfunctional monomers were not used, or they were used in amounts exceeding 15 parts, both the total light transmittance and the value of L* got worse as shown in Comparative Examples 1 and 2.

As to the kind of the polyfunctional monomers, it can be seen from Examples 4 and 5 that various polyfunctional unsaturated compounds having at least one (meth)acryloyloxy group and various polyfunctional unsaturated compounds having a cyanuric acid or isocyanuric acid skeleton can be used.

Further, it can be seen from Examples 6 and 7 that the property to be colored with pigments is good over a wide range of weight ratio of the polyorganosiloxane rubber to the polyacrylate rubber.

EXAMPLE 8

Almost the same polymerization as in Example 1 was carried out to prepare a graft copolymer in which the amount alone of methyl methacrylate to be grafted onto the compound rubber was changed. That is, the amount of methyl methacrylate to be grafted onto the compound rubber was reduced to 15 parts, but other conditions were the same as in Example 1.

Fifty parts of the graft copolymer thus produced and 50 parts of a polymethyl methacrylate polymer (trade name, Acrypet VH; produced by Mitsubishi Rayon Co., Ltd.) were mixed, and the total light transmittance, L*a*b* and Izod impact strength were measured in the same manner as in Example 1. As a result, it was found that the total light transmittance was 78%, L* was 14.2, a* was 1.2, b* was −0.2 and Izod impact strength was 6.8 kg.cm/cm.

TABLE 1

| | Polyorgano-siloxane latex (POS-1) (part) | Polyfunctional monomer | | Polyacrylate rubber | | Total light transmittance (%) | Property to be colored | | | Izod impact strength ⅛" in thickness, 23° C. (kg · cm/cm) |
|---|---|---|---|---|---|---|---|---|---|---|
| | | Kind | Amount (part) | Butyl acrylate (part) | Allyl methacrylate (part) | | L* | a* | b* | |
| Example 2 | 84 | Allyl methacrylate | 1.5 | 23.5 | 1.5 | 68 | 20.3 | 2.0 | −0.6 | 7.6 |
| Example 3 | 76 | Allyl methacrylate | 3.0 | 24.5 | 0.5 | 72 | 18.2 | 2.1 | −0.7 | 8.3 |
| Example 4 | 84 | Triallyl cyanurate | 1.5 | " | " | 61 | 19.6 | 2.5 | −0.3 | 7.9 |
| Example 5 | 84 | 1,3-Butylene glycol dimethacrylate | 1.5 | " | " | 58 | 20.1 | 1.8 | −0.4 | 7.4 |
| Example 6 | 33 | Allyl methacrylate | 0.6 | 39.2 | 0.8 | 78 | 17.2 | 1.6 | −0.3 | 7.0 |
| Example 7 | 130 | Allyl methacrylate | 2.4 | 9.8 | 0.2 | 60 | 19.8 | 2.8 | −0.8 | 9.4 |
| Comparative Example 1 | 86 | — | — | 24.5 | 1.5 | 43 | 26.8 | 4.8 | −2.6 | 8.5 |
| Comparative Example 2 | 71 | Allyl methacrylate | 4.5 | " | " | 48 | 23.5 | 3.7 | −2.0 | 6.3 |

EXAMPLE 9

One hundred parts of POS-1 produced in Example 1 was sampled and put in a separable flask equipped with a stirrer. After 75 parts of distilled water was added and the atmosphere of the flask was replaced by nitrogen, the contents of the flask were heated to 50° C. At this temperature, a mixed solution of 2.0 parts of allyl methacrylate and 0.1 part of tert-butyl hydroperoxide was added.

A mixed solution of 0.002 part of ferrous sulfate, 0.006 part of disodium ethylenediaminetetraacetate, 0.3 part of Rongalite and 10 parts of distilled water was then added to carry out radical polymerization. The reaction mixture was kept at an inner temperature of 60° C. for 1 hour.

A mixed solution of 56.8 parts of butyl acrylate, 1.20 parts of allyl methacrylate and 0.2 part of tert-butyl hydroperoxide was then dropwise added thereto over 90 minutes to carryout polymerization. Thereafter, the reaction mixture was kept at an inner temperature of 60° C. for 1 hour to complete the polymerization.

To this compound rubber was dropwise added a mixed solution of 11 parts of styrene and 0.10 part of tert-butyl hydroperoxide over 20 minutes, and the reaction mixture wa kept at an inner temperature of 60° C. for 2 hours to complete graft polymerization onto the compound rubber. The conversion of styrene was 99.3%, and the number average particle size of the graft copolymer was 0.24 μm.

This latex was added to an aqueous solution containing 5% of calcium chloride at 40° C. so that the ratio of the latex to the aqueous solution was 1:2. On heating the mixed solution to 90° C., it coagulated. After cooling, the coagulated product was filtered off, separated and dried overnight at 80° C. to obtain a powdery graft copolymer.

Using this dried graft copolymer, a flat plate of 1 mm in thickness was prepared on a press-molding machine, and the total light transmittance was measured to find that it was 54%.

Next, 15.0 parts of the above compound rubber graft copolymer, 40 parts of poly(2,6-dimethyl-1,4-phenylene) ether having a reduced viscosity (ηsp/c) of 0.59 dl/g at 25° C. in chloroform,445 part of polystyrene having a melt index value of 30 g/10 min at 200° C. under a load of 5 kg, and 0.5 part of Carbon black Vulcan-9A32 (produced by Cabot Co., Ltd.) were blended to prepare a polyphenylene ether resin composition. This resin composition was supplied a to twin-screw extruder (ZSK-30 produced by Werner & Pfleiderer Co.), melt-kneaded at a cylinder temperature of 270° C. and then pelletized. The pellets obtained were dried, supplied to an injection molding machine (Model Promat 175 produced by Sumitomo Heavy Industries, Ltd.) and injection-molded at a cylinder temperature of 280° C. and a mold temperature of 80° C. to obtain flat plates of ⅛" in thickness and various test pieces. Using these test pieces, the physical properties were evaluated. The results are shown in Table 3.

EXAMPLE 10

A graft copolymer was produced in the same manner as in Example 9 except that the amount of styrene to be grafted onto the compound rubber was 31 parts. The total light transmittance of this graft copolymer was 67%.

A polyphenylene ether resin composition was prepared in the same manner as in Example 9 except that the graft copolymer thus obtained was used. The physical properties of this resin composition were evaluated. The results are shown in Table 3.

EXAMPLES 11 TO 16 AND COMPARATIVE EXAMPLES 3 AND 4

The polyorganosiloxane latex (POS-1) prepared in Example 9 was modified with various polyfunctional monomers shown in Table 2. A mixed solution of butyl acrylate, allyl methacrylate and tert-butyl hydroperoxide was added to modified POS-1 in amounts shown in Table 2. To each compound rubber thus produced was dropwise added a mixed solution of 11 parts of methyl methacrylate and 0.10 part of tert-butyl hydroperoxide over 90 minutes, and the reaction mixture was kept at an inner temperature of 60° C. for 2 hours to complete graft polymerization onto the compound rubber. The total light transmittance of these graft copolymers obtained was measured. The results are shown in Table 2.

Polyphenylene ether resin compositions were prepared in the same manner as in Example 9 except that these graft copolymers thus obtained were used. The physical properties of these resin compositions were evaluated. The results are shown in Table 3.

TABLE 2

| | Polyorganosiloxane latex (POS-1) (part) | Polyfunctional monomer | | Acrylic rubber | | Total light transmittance (%) |
|---|---|---|---|---|---|---|
| | | Kind | Amount (part) | Butyl acrylate (part) | Allyl methacrylate (part) | |
| Example 11 | 100 | Allyl methacrylate | 2.0 | 56.8 | 1.2 | 52 |
| Example 12 | 90 | Allyl methacrylate | 5.0 | " | " | 50 |
| Example 13 | 100 | Triallyl cyanurate | 2.0 | " | " | 51 |
| Example 14 | 100 | 1,3-Butylene glycol dimethacrylate | 2.0 | " | " | 48 |
| Example 15 | 33 | Allyl methacrylate | 0.6 | 77.4 | 2.6 | 71 |
| Example 16 | 159 | Allyl methacrylate | 3.0 | 39.2 | 0.8 | 46 |
| Comparative Example 3 | 107 | — | — | 56.8 | 1.2 | 32 |
| Comparative Example 4 | 71 | Allyl methacrylate | 4.5 | " | " | 37 |

TABLE 3

| | Property to be colored | | | Izod impact strength ⅛" in thickness, 23° C. (kg · cm/cm) |
|---|---|---|---|---|
| | L* Lightness index | a* Reddish green | b* Yellowish blue | |
| Example 9 | 15.5 | 1.4 | −1.3 | 22.6 |

TABLE 3-continued

|  | Property to be colored | | | Izod impact strength 1/4" in thickness, 23° C. (kg · cm/cm) |
|---|---|---|---|---|
|  | L* Lightness index | a* Reddish green | b* Yellowish blue |  |
| Example 10 | 13.8 | 1.2 | −1.0 | 18.7 |
| Example 11 | 18.2 | 2.7 | 0.3 | 17.0 |
| Example 12 | 19.9 | 2.8 | 0.0 | 16.5 |
| Example 13 | 16.5 | 3.2 | −0.2 | 17.2 |
| Example 14 | 19.1 | 2.8 | 1.3 | 16.4 |
| Example 15 | 17.2 | 2.4 | −1.6 | 15.2 |
| Example 16 | 18.9 | 3.0 | 0.7 | 19.3 |
| Comparative Example 3 | 25.2 | 0.4 | −3.5 | 17.3 |
| Comparative Example 4 | 23.3 | 1.6 | −0.6 | 14.6 |

EXAMPLES 17 TO 23 AND COMPARATIVE EXAMPLES 5 AND 6

To 100 parts of a mixture obtained by mixing 90 parts of a polyvinyl chloride resin having a polymerization degree of 700 and 10 parts of each of the graft copolymers obtained in Examples 1 to 7 and Comparative Examples 1 and 2, were added 3 parts of dibutyltin maleate, 1 part of butyl stearate, 0.5 part of stearyl alcohol and 0.5 part of Carbon Black Vulcan-9A32 (produced by Cabot Co., Ltd.). Each mixture was mixed for 5 minutes with a Henschel mixer, and extruded at 170° C. through an extruder equipped with a 1/4" square rod-like die to obtain 1/4" square rod-like profiles. A V-form notch was cut in these rod-like profiles, and the Izod impact test was carried out to obtain the results shown in Table 4. Separately, the property to be colored of these rod-like profiles was measured with a color-specifying tester to obtain the results shown in Table 4.

TABLE 4

|  | Compound rubber graft copolymer | Property to be colored | | | Izod impact strength (kg · cm/cm) | |
|---|---|---|---|---|---|---|
|  |  | L* Lightness index | a* Reddish green | b* Yellowish blue | 23° C. | 0° C. |
| Example 17 | Obtained in Example 1 | 11.4 | 2.4 | 0.7 | 115 | 29 |
| Example 18 | Obtained in Example 2 | 12.3 | 2.2 | −0.8 | 121 | 31 |
| Example 19 | Obtained in Example 3 | 11.1 | 2.9 | 1.3 | 109 | 21 |
| Example 20 | Obtained in Example 4 | 12.2 | 1.4 | −0.9 | 116 | 30 |
| Example 21 | Obtained in Example 5 | 12.5 | 3.0 | 0.8 | 108 | 21 |
| Example 22 | Obtained in Example 6 | 10.8 | 0.4 | −1.4 | 118 | 25 |
| Example 23 | Obtained in Example 7 | 12.9 | 1.8 | −1.2 | 123 | 30 |
| Comparative Example 5 | Obtained in Comparative Example 1 | 21.7 | 0.7 | 2.9 | 120 | 28 |
| Comparative Example 6 | Obtained in Comparative Example 2 | 12.0 | 3.3 | 0.9 | 35 | 11 |

EXAMPLES 24 TO 33 AND COMPARATIVE EXAMPLES 7 TO 26

Twenty parts of each of the compound rubber graft copolymers obtained in Example 9 and Comparative Examples 3 and 4, 80 parts of the thermoplastic resin shown in Table 5 and 0.5 part of carbon black Vulcan-9A32 (produced by Cabot Co., Ltd.) were blended. Each blend was extruded through a twin-screw extruder (Model ZSK-30 produced by Werner & Pfleiderer Co.) and then injection-molded with an injection molding machine (Model Promat 175 produced by Sumitomo Heavy Industries, Ltd.) to obtain various test pieces. Using these test pieces, the physical properties were evaluated. The results are shown in Table 5.

TABLE 5

|  | Thermoplastic resin | | Compound rubber graft copolymer | | Property to be colored | | | Izod impact strength 1/4" in thickness, 23° C. (kg · cm/cm) |
|---|---|---|---|---|---|---|---|---|
|  | Kind | Amount (part) | Obtained in | Amount (part) | L* Lightness index | a* Reddish green | b* Yellowish blue |  |
| Example 24 | AS resin (Estyrene AS-30 ® produced by Nippon Steel Chemical Co., Ltd.) | 80 | Example 9 | 20 | 16.5 | −1.7 | 1.6 | 29 |
| Comparative Example 7 |  | " | Comparative Example 3 | " | 22.5 | 1.2 | −1.0 | 31 |
| Comparative Example 8 |  | " | Comparative Example 4 | " | 21.2 | 2.7 | 0.3 | 9 |
| Example 25 | Polypropylene resin (Noblene MA ® produced by Mitsubishi Petrochemical Co., Ltd.) | 80 | Example 9 | 20 | 15.7 | −2.1 | 0.0 | 10 |
| Comparative Example 9 |  | " | Comparative Example 3 | " | 24.5 | 3.2 | −0.2 | 12 |
| Comparative Example 10 |  | " | Comparative Example 4 | " | 23.9 | 1.4 | −1.3 | 4 |
| Example 26 | Nylon 6 resin (UBE Nylon 6 ® produced by Ube Industries, Ltd.) | 80 | Example 9 | 20 | 18.3 | 1.2 | −1.0 | 43 |
| Comparative Example 11 |  | " | Comparative Example 3 | " | 24.6 | −2.6 | 0.3 | 48 |
| Comparative Example 12 |  | " | Comparative Example 4 | " | 23.3 | −2.8 | 0.4 | 8 |
| Example 27 | Polycarbonate resin (Novalex 7022 A ® produced by Mitsubishi Kasei Corporation) | 80 | Example 9 | 20 | 17.6 | −3.2 | −0.2 | 47 |
| Comparative Example 13 |  | " | Comparative Example 3 | " | 21.9 | 2.8 | 1.3 | 58 |
| Comparative Example 14 |  | " | Comparative Example 4 | " | 21.9 | −0.4 | −1.3 | 9 |
| Example 28 | Polybutylene terephthalate resin (Tufper PBT N1000 ® produced by Mitsubishi Rayon Co., Ltd.) | 80 | Example 9 | 20 | 18.5 | 1.3 | −1.0 | 31 |
| Comparative Example 15 |  | " | Comparative Example 3 | " | 25.4 | 2.7 | 0.3 | 29 |
| Comparative |  | " | Comparative | " | 24.7 | 1.8 | 0.7 | 8 |

TABLE 5-continued

| | Thermoplastic resin | | Compound rubber graft copolymer | | Property to be colored | | | Izod impact strength |
|---|---|---|---|---|---|---|---|---|
| | Kind | Amount (part) | Obtained in | Amount (part) | L* Lightness index | a* Reddish green | b* Yellowish blue | 1/4" in thickness, 23° C. (kg·cm/cm) |
| Example 16 | | | Example 4 | | | | | |
| Example 29 | Polyphenylene sulfide resin | 80 | Example 9 | 20 | 17.7 | 1.1 | 1.5 | 20 |
| Comparative Example 17 | [Ryton R4 (GF40%) ® produced by Phillips Petrolium Co.] | " | Comparative Example 3 | " | 24.9 | −0.2 | −1.0 | 22 |
| Comparative Example 18 | | " | Comparative Example 4 | " | 23.8 | 0.3 | 2.9 | 7 |
| Example 30 | Polysulfone resin (Udel | 80 | Example 9 | 20 | 16.5 | 2.2 | −1.0 | 12 |
| Comparative Example 19 | P1700 ® produced by Union Carbide Co.) | " | Comparative Example 3 | " | 23.4 | 1.4 | 1.3 | 13 |
| Comparative Example 20 | | " | Comparative Example 4 | " | 22.2 | −1.2 | −1.0 | 5 |
| Example 31 | Polyethersulfone resin | 80 | Example 9 | 20 | 18.9 | −2.7 | 0.3 | 12 |
| Comparative Example 21 | (Victrex 200F ® produced by Sumitomo Chemical Co., | " | Comparative Example 3 | " | 24.8 | 2.8 | 0.0 | 13 |
| Comparative Example 22 | Ltd.) | " | Comparative Example 4 | " | 21.4 | −3.2 | −0.2 | 6 |
| Example 32 | Polyetherimide resin | 80 | Example 9 | 20 | 16.5 | 2.8 | 1.3 | 13 |
| Comparative Example 23 | (Ultem # 1000 ® produced by General Electric Co.) | " | Comparative Example 3 | " | 26.1 | 2.4 | −1.6 | 14 |
| Comparative Example 24 | | " | Comparative Example 4 | " | 25.3 | 3.1 | 0.8 | 6 |
| Example 33 | Polycarbonate resin (50 | | Example 9 | 15 | 18.4 | 1.1 | 1.5 | 55 |
| Comparative Example 25 | parts)/polybutyrene tetraphthalate resin (35 parts) | | Comparative Example 3 | " | 23.9 | −0.5 | 1.2 | 57 |
| Comparative Example 26 | | | Comparative Example 4 | " | 23.1 | 0.7 | 1.9 | 9 |

What is claimed is:

1. A graft copolymer obtained by graft-polymerizing one or more kinds of vinyl monomer onto a compound rubber, wherein that compound rubber is obtained by inseparably entangling a polyalkyl (meth)acrylate rubber and a modified polyorganosiloxane rubber, the modification being obtained by radical polymerization of 1 to 15 parts by weight of at least one monomer selected from the group consisting of polyfunctional unsaturated compound having at least one (meth)acryloyloxy group and polyfunctional unsaturated compound having a cyanuric acid or isocyanuric acid skeleton in the presence of a polyorganosiloxane robber.

2. A graft copolymer obtained by graft-polymerizing one or more kinds of vinyl monomer onto a compound rubber, wherein the proportion of compound rubber is 30 to 90 weight percent and the proportion of the vinyl monomer is 10 to 70 weight percent based on the graft copolymer, the compound rubber is obtained by inseparably entangling a polyalkyl (meth)acrylate rubber and a modified polyorganosiloxane rubber, the modification being obtained by radical polymerization of 1 to 15 parts by weight of at least one monomer selected from the group consisting of polyfunctional unsaturated compound having at least one (meth)acryloyloxy group and polyfunctional unsaturated compound having a cyanuric acid or isocyanuric acid skeleton in the presence of a polyorganosiloxane rubber.

3. A graft copolymer according to claim 1, wherein said vinyl monomer is a member selected from the group consisting of styrene, 2-methyl styrene, vinyl toluene, methyl methacrylate, 2-ethyl meta crylate, methyl acrylate, ethyl acrylate, butyl acrylate, acrylic acid, meth acrylic acid, acylonitride and methacrylonitrate.

4. A graft copolymer according to claim 1 wherein proportion of the vinyl monomer is 15 to 60 wt. % and the proportion of the compound rubber is 40 to 85 wt. %, based on the graft copolymer.

5. A thermoplastic resin composition comprising the graft copolymer according to claim 1 and at least one thermoplastic resin selected from the group consisting of vinyl (co)polymer resins obtained by (co)polymerizing one or more kinds of vinyl monomer selected from the group consisting of aromatic alkenyl compounds, methacrylates, acrylates and vinyl cyanide, modified polyphenylene ether resins comprising a polyphenylene ether resin and a polystyrene resin, polyvinyl chloride resins, polyamide resins, polycarbonate resins, polyester resins, polyphenylene sulfide resins, polysulfone resins, polyetherimide resins and polyolefins resins.

6. A thermoplastic resin composition according to claim 5, wherein the thermoplastic resin is a modified polyphenylene ether resin.

7. A thermoplastic resin composition according to claim 5, wherein the thermoplastic resin is a polyvinyl chloride resin.

* * * * *